United States Patent

[11] 3,547,216

| [72] | Inventor | Robert Marie<br>Hagerstown, Ind. |
|---|---|---|
| [21] | Appl. No. | 733,502 |
| [22] | Filed | May 31, 1968 |
| [45] | Patented | Dec. 15, 1970 |
| [73] | Assignee | Dana Corporation<br>Toledo, Ohio<br>a corporation of Virginia |

[54] TOP SPEED LIMITING DEVICE
10 Claims, 5 Drawing Figs.

[52] U.S. Cl.................................................. 180/107,
180/108, 180/114, 123/102
[51] Int. Cl......................................................... B60k 31/00
[50] Field of Search............................................ 180/105-
—110; 123/102, 103; 307/10; 180/114

[56] References Cited
UNITED STATES PATENTS

| 2,661,071 | 12/1953 | Hoener | 180/110 |
| 3,090,460 | 5/1963 | Teetor | 180/105 |
| 3,126,078 | 3/1964 | Novotny | 180/UX |
| 3,360,069 | 12/1967 | Chana et al. | 180/108 |
| 3,343,625 | 9/1967 | Scheuermann | 307/10 |

*Primary Examiner*—Kenneth H. Betts
*Attorney*—Walter E. Pavlick, Harold D. Shall, Richardson B. Farley and John F. Teigland

ABSTRACT: An upper speed limiting governor for vehicle speed regulation is provided which is essentially tamper proof since speed sensing is accomplished by pressure read out from the vehicular hydraulic transmission by a positive connection of it with the upper limit speed regulator. At the same time, the upper limit speed regulator is physically interposed in series between the vehicular carburetor and accelerator pedal. Additionally, the ignition circuit of the vehicle is placed in series with the upper limit speed regulator and a portion of a resistance wire is physically disposed within the upper limit speed regulator that reduces the current supplied to the primary coil of the vehicular distributor coil so as to maintain it at its proper value.

INVENTOR.
ROBERT MARIE

INVENTOR.
ROBERT MARIE

TOP SPEED LIMITING DEVICE

This invention relates generally to speed control devices, and, more particularly, to an upper limit speed control regulator for a vehicle.

Although speed control devices for vehicles are known which provide control for maintaining speed, provide throttle advance and retard and provide for limiting upper speed, these units suffer from the fact that they can be easily disabled or overridden by the vehicle operator so that he may, at will, operate his vehicle at whatever speed the horsepower of the motor of the vehicle dictates.

As the nation's highways become more and more crowded and death and personal injury from vehicular traffic increases, more and more emphasis is placed on automotive safety by governmental officials and an aroused public. Responsible agencies such as the Automotive Safety Council continually make predictions relative to the deaths and injuries which will occur over a long holiday weekend. Unfortunately, these predictions quite often prove conservative. Although vehicular caused deaths and injuries are dependent upon a variety of reasons it has been clearly proved that one of the major contributors to this national toll is excessive highway speed.

It would, therefore, be advantageous to provide each vehicle with an upper speed limiting device which would positively insure that the vehicle in question would be preset so as to be unable to exceed a certain predetermined speed. Moreover, the provision of such an upper road speed limiter may soon become mandatory because of applicable rule making power contained in the provisions of the National Traffic and Motor Vehicle Safety Act of 1966.

Although, as set out above, upper speed limiting devices are known, none of these prior art known devices are specifically designed to prevent the average vehicle operator from disabling the speed control device so that he may operate the vehicle as if the vehicle had no such equipment. Such modification normally takes the form of an inactivation of the speed sensing portion of the speed control device or the like, or a disabling of the entire unit by its physical removal or severance of its physical connections with the normal operative components of the vehicles such as the carburetor, ignition system, and throttle pedal. Accordingly, it would be advantageous to provide an upper limit speed control unit which could not be easily disabled without a consequent disabling of the vehicle itself.

It is, therefore, an object of this invention to provide an upper speed limiting unit which is connected in series between the battery and ignition circuit of the vehicle.

It is an additional object of this invention to incorporate within the upper speed limiting unit a resistance means which reduces battery electric current to the proper current flow to the ignition system of the vehicle and thereby limits operator tampering with the upper speed limiting unit.

It is a further object of the invention to locate the upper speed sensing unit within the vehicle in a physical position which eliminates or lessens the possibility of actuating the carburetor directly through the throttle pedal.

It is a still further object of the invention to utilize a positive, predetermined modified governor pressure of the hydraulic transmission as a speed sensing means.

It is yet another object of the invention to directly and physically connect the upper speed limiting unit to the hydraulic transmission.

It is a still further object of this invention to provide an upper speed limiting unit which is durable, easily manufactured, easily maintained and positively designed to prevent tampering by the vehicle operator.

In accordance with the foregoing objects of the invention, an upper speed limit governor for upper speed control of a vehicle is provided between the carburetor and accelerator pedal which includes an electric motor that may be reversed, to drive through a linkage means, the throttle plate of a carburetor. A speed sensing means is included comprising a tap from the hydraulic transmission that operates a piston, the piston being spring biased by a spring of a predetermined force value so as to provide limited movement for speed read out. Movement of the piston causes closing of forward or reversing contacts on the electric motor so that the motor will drive in a forward or reverse direction to monitor the throttle valve plate setting of a vehicular carburetor. The electric motor receives its energy from wiring leading from the battery while the ignition system of the vehicle is energized by a lead extending from the upper speed limiter. A resistance wire is included within the lead extending from the upper speed limiter to insure that a proper lowering of current value is obtained to operate the primary coil of the ignition circuit. Thus, an upper speed limiting unit is provided which has a positive connection with both the transmission and the ignition circuit of the vehicular engine and is interposed, physically, between the vehicular engine and accelerator pedal.

A more proper understanding of the operation of the invention and its exact structural arrangement will be arrived at with reference to the following detailed description and appendant drawings.

Figure 1:
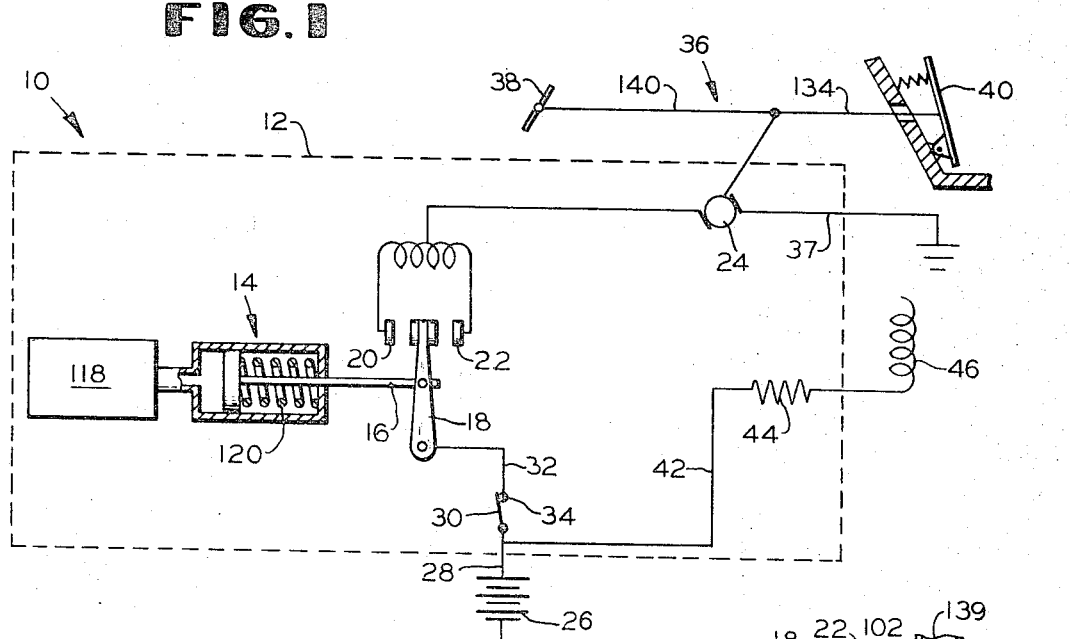
FIG. 1 is a representation, schematically, of the invention as disposed in a vehicle and shows its general connections to the vehicular systems.
Figure 2:
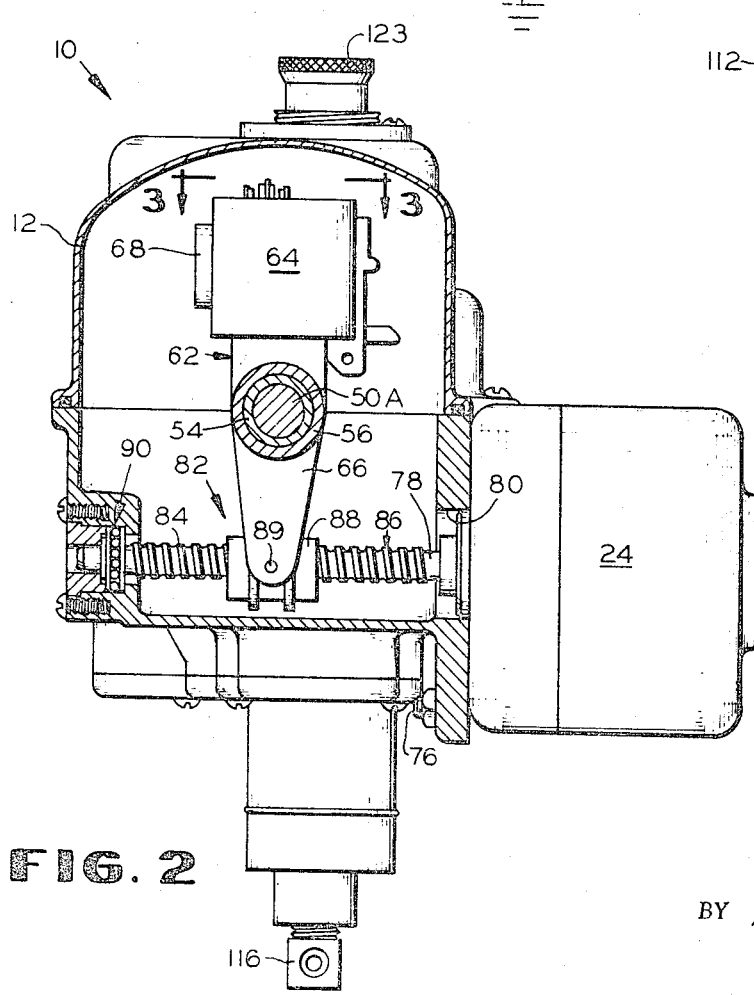
FIG. 2 is a side view taken on line 2—2 of FIG. 4 of the upper speed limiter and its included housing.

Referring now more particularly to FIG. 1 for a better understanding of the invention, there is shown an upper speed limiting unit 10 provided with a housing 12 (indicated in dotted lines) containing a speed sensing unit 14 having a piston means 16 pivotally connected to a switch blade means 18. The switch blade means 18 is capable of movement so as to abut against a contact 20 or a contact 22 so as to drive an electric motor 24 in a forward or reverse direction.

Current is supplied to the motor 24 by means of a battery 26 which, it is to be understood, is the standard vehicle battery supplied for powering of the vehicle's electrical systems. A lead 28 extends from the battery 26 to an overload cutout switch 30 within the housing 12. Cutout switch 30 is a conventional bimetallic switch and provides overload protection, upon overheating, for the upper speed limiting unit 10 so that a short therein will not cause an interruption of current to the remaining electrical components of the vehicle. A lead 32 extends from an opposite contact 34 of the cutout switch 30 and is electrically connected to the link 18. Thus, current may flow from the battery 26, through lead 28, contact 34 and lead 32 to either of the contacts 20 or 22 to drive electric motor 24 in a forward or reverse direction, current being led to ground through a lead 37. The motor 24 is attached by a linkage means 36 (to be described in more detail later) to a throttle valve 38 located in the carburetor of the vehicle and to an accelerator pedal 40 which provides for acceleration and deceleration in the vehicle by imposition of the vehicle operator's foot.

Through a conventional automotive ignition switch (not shown) a lead 42 is also electrically connected to the lead 28 on the battery side of the lead. It includes an ignition resistance 44, integral therewith, which is partially disposed within the housing 12 and extends outwardly therefrom for connection to a primary coil 46 of the ignition coil of the vehicular ignition system (not shown). By this physical arrangement the upper speed limiting unit 10 is placed in electrical series relationship between the vehicle battery and ignition circuit and includes at least a portion of the resistance wire within its confines, which resistance wire is absolutely required to prevent burnout of the ignition system under vehicle operating conditions.

Figure 4:
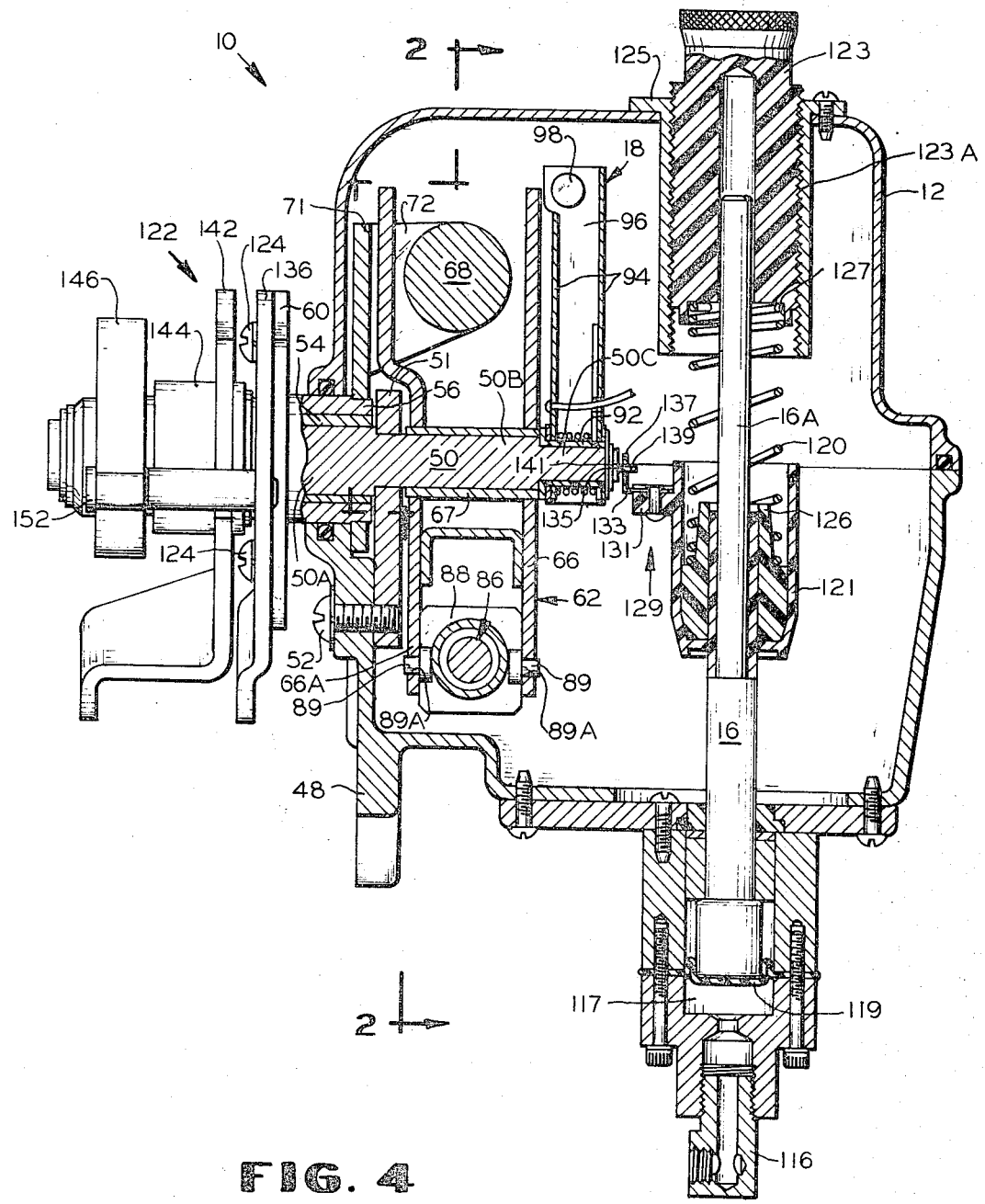
FIG. 4 is a view of the device taken in the direction of line 4—4 of FIG. 5.
Figure 5:
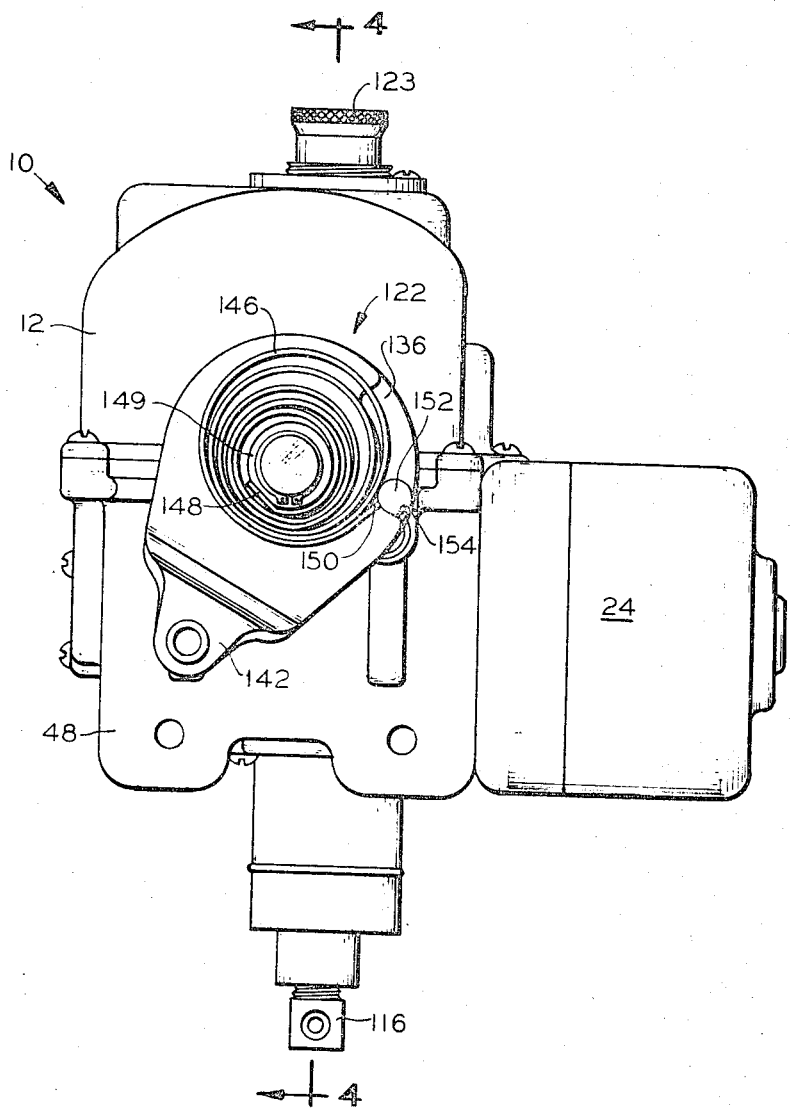
FIG. 5 is an end view of the device showing the torsional override arrangement.

The upper speed unit 10 is preferably mounted under the hood of an automotive vehicle by the aforementioned housing 12. The housing includes a mounting pad 48 that may be mounted to a bracket or the like (not shown) within the motor compartment. A stationary shaft 50 extends through the wall of the housing 12 (FIG. 4) and, intermediate its ends, is provided with a fixed flange plate 51 which, in turn, is attached to the wall of the housing by screws 52 (only one shown). A bushing 54 is mounted on an enlarged portion 50A of the shaft 50 so as to provide a bearing surface for a hub portion 56 that extends outwardly from the housing 12 and has a throttle valve connecting member 60 rigidly mounted thereon which forms a connecting portion of the linkage means 36 so as to provide for actuation of the throttle valve 38 of the vehicular carburetor by the upper speed limiting unit.

The upper speed limiting unit 10 provides a resistance to advancing movement of the throttle control member of the vehicle at a predetermined speed and is preset to the predetermined speed by means, and in a manner, which will now be described. To provide speed control to the advancing throttle pedal, the upper speed limiting unit 10 is provided with an actuating means 62 that includes a yoke portion 64 which terminates in a pair of spaced downwardly disposed arms 66 and 66A. The yoke portion 64 is rotatably mounted on the shaft 50 on an intermediate portion 50B thereof by a bushing 67 fixedly attached between the arms 66 and 66A slightly above the intermediate point of their terminations. A stop limiting member 68 of general cylindrical shape is attached to a bight portion 70 of the yoke 64 between the yoke arms 66, 66A. The stop limiting member 68 is of such dimension as to extend outwardly and leftwardly beyond the leftward extent of the yoke portion 64 so as to be engageable with an inwardly bent tab 72 of an operating member 71 mounted fixed relative to the hub portion 56. The inwardly bent tab 72 extends generally at right angles to the major portion of the operating member 71 and is thereby easily engaged by the stop limiting member 68 as the yoke 64 of the actuating means 62 swings in opposition to the operating member 71.

The actuating means 62 is pivotally mounted on the shaft 50 for movement through a range of positions corresponding to the idle and full open position of the accelerator pedal 40 or corresponding to the full idle and open positions of the throttle valve 38 but is limited in its movement between these positions by the electric motor 24 and its connected drive as described hereinbelow. By this arrangement the actuating means 62 acts as a stop or abutment to limit further advancement of the throttle valve 38 when the upper speed limiting unit 10 has reached its predetermined speed.

In order to provide resistance to further movement of the throttle valve 38, drive means in the form of the electric motor 24 is mounted on the exterior of housing 12 so as to provide a compact unit therewith. The electric motor 24 is arranged to provide for moving the actuating means 62 through the range of its positions for upper speed limiting. The piston 16, as set out before, is responsive to the speed of the vehicle and signals the direction of rotation and movement of the motor 24 and actuating means 62. The motor 24 is mounted on the outside of the housing 12 by studs 76 (only one shown), with a shaft 78 of the motor 24 extending through an opening 80 in the housing 12, so as to enable utilization of a smaller housing and easily connected subassembly formed by the motor. The motor size may also be small since its drive is provided with a large gear reduction furnished by a screw and nut means 82, connected, integrally therewith on the shaft 78. The shaft 78 of the motor 24, at the end extendingly into the housing 12, is thereby formed with a threaded portion 84 to form a screw 86 which extends substantially the full length of the housing 12.

Mounted on the screw 86 is a nut 88, generally rectilinear in cross section, which reciprocates along the screw 86 as it is rotated by the motor 24. Screw 86 is journaled in a series of bearings formed by a beating means 90 mounted in the sidewall of the housing 12 opposite the sidewall of the housing 12 mounting the electric motor 24. Energization of the screw 86 is thereby effected by the motor 24 to move the nut 88 along the screw to pivot the actuating means 62. Reference may be made to U.S. Pat. 2,446,393, Robert C. Russell, issued Aug. 3, 1948, for further details of the construction of a similar screw and nut means. The stop limit means 68 is, of course, pivotally connected to the nut 88, such connection being conveniently afforded by a pair of pivot pins 89, 89 extending outwardly from the nut 88 and pivotally received in bores 89A, 89A formed in the cover portions of yoke arms 66 and 66A.

The electric current flow signal to provide for forward and reverse drive of electric motor 24 is provided by the switch blade means 18 which is rotatably mounted on the innermost extended portion 50C of the stationary shaft 50, the portion 50C being of still smaller diameter than the shaft portion 50B. This mounting is accomplished by means of an insulating bushing 92 made of a material such as Teflon or the like that is interposed between the switch blade means 18 and the stationary shaft 50. Switch blade means 18 is generally yoke shaped having a pair of arms 94, 94 extending at right angles to an integral bight portion 96, with the lower portion of the arms 94, 94 pivotally mounted on the insulated bushing 92 and the upper portion of the arms 94, 94 terminating short of the upper extent of the bight portion 96. Mounted on the opposite faces of the upper end of the extended bight portion 96 are a pair of contacts 98, 98. These contacts are of generally button shape and extend at right angles from the bight portion so as to provide abutable contact means for the opposite directions of pivoting movement of the switch blade means 18.

The switch blade means 18, at its upper end, extends into a U-shaped member 100 forming a flange of insulating material of plastic or the like and carried by the actuating means 62. The U-shaped member 100 provides a means for rigidly carrying the contacts 20 and 22, previously mentioned, so that these contacts may form electric connections with the contacts 98, 98 as the switch blade means 18 pivots leftwardly and rightwardly. The U-shaped member 100 includes an integral extending tang portion 102 which extends from a leg 104 of the U-shaped member 100 and provides a means for connecting the U-shaped member to the stop limiting member 68 through an insulating mounting plate 106. The insulating plate member 106, also made of plastic or the like, is connected by a screw 108 to the extending tang portion 102 of the U-shaped member 100 and, in turn, is connected to the actuating means 62 by a screw or other conventional means (not shown). Thus, positive positioning is provided for the mounting of the contacts 20 and 22 in a fixed position relative to the moving position of the actuating means and thereby the stop limiting member 68.

Figure 3:
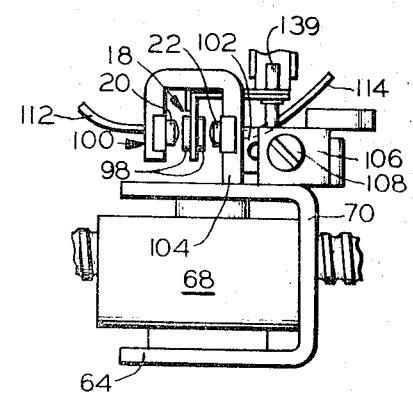
FIG. 3 is a fragmentary view of a portion of the upper speed limiter taken substantially on line 3—3 of FIG. 2.

To complete the circuitry already described with reference to FIG. 1 between the electric motor 24 and switch blade means 18, a pair of leads 112 and 114 (FIG. 3) extend from the contacts 20 and 22 to opposite sides of a field winding of the electric motor 24. By this electrical configuration, the reversible electric motor 24 may be driven in opposite directions dependent wholly upon which of the contacts 20 and 22 are abutted by and therefore in electrical contact with the switch blade means 18. (Movement of the switch blade means 18 between the contacts 20 and 22 is, of course, obtained by the movement of the speed sensing means 14 (FIG. 1).)

Speed sensing means 14 is provided with a tap 116 from a hydraulic transmission 118 of the vehicle. Pressure from tap 116 is bled into a chamber 117 which has its end, opposite the tap end, sealed by a bellowslike element 119, sold under the trademark, Bellofram, for example, the said bellowslike element being capable of upward (outward) and downward (inward) expansion and contraction movement dependent upon pressure changes in the chamber 117. Piston means 16 is disposed against the outer side of the bellowslike element 119 so that it moves therewith, being only limited in its movement by the expansive force of coil spring means 120, this spring means being disposed in surrounding relationship about a stem portion 16A of it. The spring means 120 provides the limiting force against which the bellowslike element moves by being received between a cuplike member 121 fixed to the stem portion 16A of the piston rod 16 and a spring adjusting member 123 which is threadingly inserted in a bushing 125 fixed to the housing 12.

Both the cuplike member 121 and the spring adjusting member 123 include means for guiding the spring means 120 so that it moves freely in its expansion and compression without any binding action. Such means is provided by the portions 126 and 127 formed respectively on the cuplike member 121 and spring adjusting member 123 which receive and guide the ends of the spring means 120 to prevent misalignment of them. The spring means 120 can be adjusted in its compressive force by movement inwardly or outwardly of the spring adjusting means 123 and can be set for a particular transmission pressure by the utilization of a epoxy 123A placed on the threads of the adjusting member 123. Said compressive force of the spring means 120 is set by utilizing a known pressure generated within the vehicular transmission 118 (at the tap 116) for a given and desired upper speed limit of the vehicle; speed may thereby be controlled such as, for example, at 80 m.p.h.

Pressure above the predetermined pressure causes the coil spring means 120 to compress due to the movement of the piston 16 upwardly. As this piston moves upwardly, contact 22 is closed and electric motor 24 operates to advance stop limiting member 68 against operating member 71. If the speed of the vehicle falls below the predetermined speed, the pressure in the hydraulic transmission 118 drops causing the piston means 16 to move downwardly under the urging of spring means 120. This closes the contact 20 and operates the electric motor 24 in the opposite direction rotating the stop limiting member 68 away from operating member 71 and permitting the vehicle operator to accelerate the vehicle through the throttle 40 until the upper speed is again reached.

To insure that the aforementioned upward and downward movement of piston means 16 causes the opening and closing of contacts 20 and 22 the following arrangement is provided by a means 129. The cuplike member 121 includes an integral tang 131 which extends generally perpendicular to the axis of cuplike member 121 to serve as a mounting post for a thin metallic right angle element 133. A bore 135 extends through an upwardly extending leg 137 of the right angle element 133 and pivotally receives a pin 139 so as to form a bearing means therefore. The pin 139, in turn, is fixedly mounted in offset relation at 141 to the outer leg 94 of switch blade means 18 and extends thereto and is mounted (not shown) on the other leg 94 of the switch blade means 18. It should be understood, that the said "offset" is an offset relative to the vertical axis of the switch blade means 18 so that movement of pin 139 upwardly or downwardly with the movement of piston means 16 pivots the switch blade means clockwise or counterclockwise thereto and into and out of contact with the electric contacts 20 and 22.

In the event that the vehicle operator attempts to accelerate his vehicle beyond that point provided by the limiting stop member 68, to eliminate wear on the motor and bearings due to excessive loading, a torsional override means 122 is provided. Disposed outwardly of the housing 12 of the upper speed unit 10 is a connecting disc 136 which is mounted on the hub portion 56 and is connected by screws 124, 124 or the like to the connecting member 60 so as to be rotatable therewith. The connecting disc 136, then, in turn, is connected to the throttle valve 38, through a link 140 (FIG. 1).

An accelerator actuated member 142 having an integral hub portion 144 is rotatably mounted on the stationary shaft 50 outwardly of the connecting disc 136 so as to be rotatable along with connecting disc 136 or rotatable relative thereto. A wound torsional spring 146 connected between the accelerator actuated member 142 and the connecting disc 136 permits this function.

The torsional spring 146 is connected at its inner wound end 148 to an outer portion 149 of the hub portion 144 by being welded thereto or inserted in a groove therein (not shown) or the like. The torsional spring 146 extends circumferentially in an expanding coil from the outer portion 149 so that its outer end 150 is connected to a pin 152 extending outwardly from the connecting disc 136. The pin 152 extends parallel to the axis of the stationary shaft 50 so that the spring center is around this stationary shaft. Because of the disposition and relative strength of the torsional spring 146, relative rotation between the throttle actuating member and accelerator actuated member is permitted in a counterclockwise direction upon abutment of the operating member 71 against the stop limiting member 68 but no relative rotation is permitted unless there is this abutment so that the vehicle operator may maintain any desired speed below the limiting speed. The pin 152 also serves another function since it operates as a stop to limit rotation of the accelerator actuated member relative to the connecting disc 136 in a clockwise direction by abutting against a stop 154 provided on the accelerator actuated member. By the structural arrangement just described, a positive advance of the throttle by throttle pedal movement and positive advance of the carburetor valve plate is obtained unless the vehicle operator attempts to accelerate the throttle valve beyond that position set by the speed sensing unit 10. In such case, the accelerator actuated member 142 rotates relative to the connecting disc 136 and winds torsion spring 146 to prevent undue loading on the motor 24 of the upper speed limiting unit 10.

A single embodiment of this invention has been shown and described but it should be readily apparent to one skilled in the art that many changes may be made therein without departing from the scope of this invention as defined in the following claims.

I claim:
1. In a speed control unit, the combination including:
   a. a speed signal source;
   b. speed sensing means operatively connected to said speed signal source, said speed sensing means being preset to a preselective upper limiting speed;
   c. carburetor valve plate actuating means disposed between the vehicular carburetor and throttle so as to place the carburetor valve plate actuating means in a series relationship with said vehicular carburetor and throttle;
   d. a housing for the said speed control unit; and
   e. a resistance wire means disposed at least partially within said housing and electrically connected in series with the vehicular ignition coil to minimize tampering with the speed control unit.

2. The combination set out in claim 1 wherein said carburetor valve actuating means includes a lost motion means having a torsional spring.

3. The combination set out in claim 1 wherein said speed signal source is provided by a tap from the vehicle transmission.

4. In a speed control unit for upper speed limiting, the combination including:
   a. a pressure source;
   b. speed sensing means connected to said pressure source;
   c. switch actuating means connected to said speed sensing means;
   d. switch means operatively connected to said switch actuating means;
   e. reversible electric motor means including connecting means energized by said switch means;
   f. throttle stop means positionable in respect to movement of said connecting means;
   g. lost motion means disposed between said throttle stop means and a vehicular throttle;
   h. housing means for said speed control unit; and
   i. resistance wire means disposed at least partially within said housing means and connected to the vehicular ignition system to minimize tampering with the speed control unit.

5. The combination set out in claim 4 wherein said lost motion means comprises:
   a. a pair of relatively rotatable disclike members; and
   b. torsional spring means disposed in resilient and driving relationship between said disclike members.

6. The combination set out in claim 4 wherein said speed sensing means comprises:
   a. a pressure tap;
   b. a chamber disposed adjacent said pressure tap, communicating with said pressure tap;
   c. a bellowslike element closing one end of said chamber;
   d. a piston means disposed in abutting relationship with said bellowslike element; and
   e. means connecting said piston means to said switch actuating means.

7. In an upper speed limiting unit the combination comprising:
   a. a housing means for said upper speed limiting unit;
   b. a speed sensing means for said upper speed limiting means including:
      1. a pressure tap for connection to a vehicular transmission fixed with respect to said housing means;
      2. a bellowslike element disposed adjacent said pressure tap to form a chamber therebetween;
      3. a resiliently loaded piston means disposed outwardly of said chamber and resiliently biased into abutment with said bellowslike element; and
      4. switch means operatively connected to said piston means and electrically opening and closing dependent upon the position of said piston means;
   c. a carburetor valve plate actuating means including:
      1. a reversible electric motor means actuated by said switch means of said speed sensing means;
      2. a driven means operatively connected to said reversible electric motor means;
      3. an actuating means pivotally mounted within said housing and pivotally movable by said driven means;
      4. stop means mounted with said actuating means;
      5. an operating member pivotally mounted in said housing and engageable by said stop means; and
      6. a connecting disc disposed outwardly of said housing and directly driven by said operating member, said connecting disc being connected by a linkage means to the vehicular carburetor valve plate;
   d. an accelerator actuated means disposed outwardly of said connecting disc and including:
      1. an accelerator actuated member and;
      2. a wound torsional spring disposed in driving and resilient lost motion relationship between said accelerator actuating member and said connecting disc and
   e. an electrical lead including a resistance element disposed at least partially in said housing means and extending outwardly therefrom for connection to a vehicular ignition coil; and whereby said speed limiting unit forms an operative portion of the vehicular ignition and fuel supply systems and is positively connected to the vehicular transmission to thereby limit tampering and disablement of the function of the speed limiting unit.

8. The combination set out in claim 7 wherein said speed sensing means includes means for adjustably resiliently loading said piston means.

9. The combination set out in claim 7 wherein:
   a. a link extends from said accelerator actuated member for connection to the vehicle throttle; and
   b. a link extends from said connecting disc to said carburetor throttle valve.

10. In a speed control unit, the combination including:
    a. a pressurized source;
    b. speed sensing means activated by said pressurized source;
    c. reversible motor means actuated by said speed sensing means;
    d. housing means for enclosing at least a portion of said speed control system;
    e. electric circuit means for said reversible electric motor;
    f. said electric circuit means including a resistance wire means disposed at least partially in said housing means to minimize tampering with the speed control unit; and
    g. said resistance wire means being electrically connected in series to the ignition coil of the vehicle.